(12) United States Patent
Krueger

(10) Patent No.: US 12,711,646 B2
(45) Date of Patent: Aug. 18, 2026

(54) OBJECT KEYPOINT DETECTION

(71) Applicant: KONINKLIJKE PHILIPS N.V., Eindhoven (NL)

(72) Inventor: Sascha Krueger, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 448 days.

(21) Appl. No.: 18/029,719

(22) PCT Filed: Sep. 22, 2021

(86) PCT No.: PCT/EP2021/076001
§ 371 (c)(1),
(2) Date: Mar. 31, 2023

(87) PCT Pub. No.: WO2022/073761
PCT Pub. Date: Apr. 14, 2022

(65) Prior Publication Data

US 2023/0410346 A1 Dec. 21, 2023

(30) Foreign Application Priority Data

Oct. 6, 2020 (EP) .................................... 20200281

(51) Int. Cl.
*G06T 7/70* (2017.01)

(52) U.S. Cl.
CPC ...... *G06T 7/70* (2017.01); *G06T 2207/10088* (2013.01); *G06T 2207/20044* (2013.01); *G06T 2207/20084* (2013.01)

(58) Field of Classification Search
CPC ............. G06T 7/70; G06T 2207/10088; G06T 2207/20044; G06T 2207/20084; G06V 10/764; G06V 2201/12; G06V 20/647
See application file for complete search history.

(56) References Cited

U.S. PATENT DOCUMENTS

2005/0180623 A1 8/2005 Mueller et al.
2015/0181680 A1 6/2015 Wang et al.
2019/0130602 A1 5/2019 Hall et al.

FOREIGN PATENT DOCUMENTS

CN 110910449 * 12/2019
CN 111160326 A 5/2020
(Continued)

OTHER PUBLICATIONS

Machine translation for CN 110910449 (Year: 2019).*
(Continued)

*Primary Examiner* — Qian Yang

(57) ABSTRACT

A system for obtaining object keypoints for an object in a medical scanner, wherein the object keypoints are three dimensional, 3D, coordinates with respect to the medical scanner of pre-determined object parts. The system comprises a camera system for obtaining two dimensional, 2D, images of the object in the medical scanner, wherein the camera system comprises one or more cameras, and a processor. The processor is configured to obtain scanner variables from the medical scanner, wherein the scanner variables include the position of a part of the medical scanner which determines a relative position between the cameras in the camera system and the object. The processor determines object keypoint projections in 2D coordinates based on the 2D images from the camera system and determines the object keypoints in 3D coordinates by triangulating the object keypoint projections with respect to the camera system based on the scanner variables.

16 Claims, 2 Drawing Sheets

(56) References Cited

FOREIGN PATENT DOCUMENTS

| | | | |
|---|---|---|---|
| EP | 3 693 926 | * | 8/2020 |
| EP | 3693926 | A2 | 8/2020 |
| WO | 2016149189 | A1 | 9/2016 |

OTHER PUBLICATIONS

Iskakov et al "Learnable Triangulation of Human Pose" Computer Vision May 2019.
Karashchuk et al "Anipose: A Toolkit for Robust Markerless 3D Pose Estimation" Cell Reports, vol. 36, Issue 13, Sep. 2021.
Qin et al "Triangulation Learning Network: from Monocular to Stereo 3D Object Detection" Jun. 2019.
International Search Report and Written Opinion from PCT/EP2021/076001 mailed Dec. 22, 2021.

* cited by examiner

OBJECT KEYPOINT DETECTION

CROSS REFERENCE TO RELATED APPLICATIONS

This application is a U.S. national phase application of International Application No. PCT/EP2021/076001 filed on Sep. 22, 2021, which claims the benefit of EP Application Serial No. 20200281.2 filed Oct. 6, 2020 and is incorporated herein by reference.

FIELD OF THE INVENTION

The invention relates to determining three dimensional object keypoints for medical examinations.

BACKGROUND OF THE INVENTION

Preparing a subject for medical examinations (e.g. magnetic resonance, ultrasound, CT scans etc.) is a time-consuming task and requires trained operators. For example, in magnetic resonance (MR) scans, the operator has to place surface coils on the anatomy to be imaged. The scan plane needs to be defined appropriately to execute the survey scan. In order to define the scan plane, typically a light visor is used after the subject setup (including blankets, cushions, hearing protection, nurse call) has been completed. Often the view of the target anatomy is blocked by the setup. The light visor laser device is switched on and the subject is moved with the setup to the marked reference position. Then the operator presses a button to activate and transfer the coordinates to the scanner.

Recently, use of 3D optical depth sensing cameras has been proposed to simplify and automate this task. However, in obstructed scenarios, this approach has limitations. For example, when a coil is placed on top of anatomy to be imaged, it is extremely difficult to robustly and accurately determine the 3D position of the obstructed anatomy with a depth sensing camera, because no valid depth readings are available. Additionally, depth readings are only available for the topmost object in the scenery. Optical depth cameras cannot “see” through objects.

Thus, there is a need for a system to obtain accurate and reliable 3D coordinates of important keypoints during medical examinations. Additionally, there is a need for a system which can obtain the 3D coordinates of obstructed keypoints.

EP 3693926 discloses a trained network to estimate a three-dimensional (3D) body surface and body regions of a patient from surface images of the patient. The estimated 3D body surface of the patient is used to determine an isocenter of the patient. The estimated body regions are used to generate heatmaps representing visible body region boundaries and unseen body region boundaries of the patient.

SUMMARY OF THE INVENTION

The invention is defined by the claims.

According to examples in accordance with an aspect of the invention, there is provided a system for obtaining object keypoints for an object in a medical scanner, wherein the object keypoints are three dimensional, 3D, coordinates with respect to the medical scanner of pre-determined object parts, the system comprising:

- a camera system for obtaining two dimensional, 2D, images of the object in the medical scanner, wherein the camera system comprises one or more cameras;

- a processor configured to:
  - obtain scanner variables from the medical scanner and/or the camera system, wherein the medical scanner contains a first moving part and/or wherein the camera system contains a second moving part and wherein the scanner variables include the position of the first moving part of the medical scanner and/or the second moving part of the camera system;
  - determine object keypoint projections in 2D coordinates based on the 2D images from the camera system; and
  - determine the object keypoints in 3D coordinates by triangulating the object keypoint projections with respect to the camera system based on the scanner variables.

Typically in medical scanners (e.g. MRI scanners) a part of the scanner is moved in order for it to scan an object in the form of a desired body part of a subject. For example, the subject may be lying down on a table in the medical scanner while the scanning section of the medical scanner is maintained stationary. The table, with the subject on top, is then moved such that the desired body part is in the imaging plane (or imaging section) of the scanner.

Of course, the scanning result will be equivalent if the subject is stationary and the scanner is moved relatively to the subject. The cameras may then move with the scanner hence giving a changing relative position between the camera system and the object. In this case, the scanner variables may contain the position of the scanner and/or the position of the cameras. In general, the scanner variables contain the position of a moving part of the medical scanner and/or the camera system.

In order to estimate the best positioning of the subject with respect to the medical scanner, object keypoints can be used. Object keypoints may include body parts (such as head, shoulders, elbows, wrists, hip, knees, ankles etc.) and/or they may include objects worn or near the subject (e.g. coils, ECG leads, headsets etc.). In order to increase the accuracy of the positioning of the subject, it is desirable to obtain the object keypoints in 3D coordinates.

A camera system can be used to obtain 2D images of the object in the medical scanner. Object keypoint projections, in 2D coordinates, can be determined from the 2D images which correspond to the object keypoints. The camera system could comprise one camera or more than one camera.

Additionally, due to the movement of the medical scanner, the camera system can obtain 2D images of the object at different viewpoints (e.g. different angles). Scanner variables can also be obtained from the medical scanner which quantify the movements of the medical scanner (e.g. horizontal motion, vertical motion, angle of motion etc.). Alternatively, the cameras in the camera system could be moved to obtain the different viewpoints.

The scanner variables can be used in combination with the 2D images taken at different viewpoints (and the object keypoint projections of each of the images) to triangulate the object keypoint projections and thus determine the object keypoints in 3D coordinates with respect to the medical scanner.

For example, a first 2D image of a subject in a medical scanner may be taken by a first camera. A first point (e.g. a pixel or group of pixels) in the first 2D image may be determined (i.e. a first object keypoint projection), corresponding to the center of the head of the subject. The object keypoint projection may be a projection of the 3D object keypoint onto the first 2D image.

Subsequently, a second 2D image may be taken by the first camera after the subject has been moved in the medical scanner by a moving part of the medical scanner. The scanner variables contain the distance moved by the moving part of the medical scanner (and thus the distance moved by the subject). A second point in the second 2D image may be determined (i.e. second object keypoing projection), corresponding to the center of the head of the subject.

The first point and the second point can thus be used to triangulate the object keypoint projection and thus determine the object keypoint in 3D. Triangulation refers to the process of determining a point in 3D space given its projections onto two, or more, images. Triangulation is sometimes also referred to as reconstruction or intersection.

Each point in a 2D image corresponds to a line in 3D space from a camera (or sensor) to the corresponding point in 3D coordinates. Thus, all points on the line in 3D are projected to the point in the image. A pair of points in two images correspond if they are the projection of a common 3D point (i.e. the object keypoint). The two lines to the pair of points thus intersect at the object keypoint in 3D coordinates.

The movement of the moving part of the medical scanner can be made equivalent to a movement of the first camera, and thus it can be assumed that the first subject has not moved and the first image has been obtained with the first camera and the second image has been obtained with a first virtual camera, where the relative position between the first camera and the first virtual camera can be found based on the distance moved by the moving part of the medical scanner.

A first line from the first camera (corresponding to the first point) and a second line from the first virtual camera (corresponding to the second point) can thus be determined, where the intersection of the first line and the second line in 3D space defines the object keypoint.

In some cases the lines may not intersect in 3D space (e.g. due to noise, lens distortion, object keypoint detection error etc.). In the cases where the lines don't intersect, the mid-point between the two lines (i.e. a point which minimizes the distance between the first and second lines) may be used as the object keypoint.

It will be appreciated by a person skilled in the art that a second image may be alternatively obtained with a second camera at a position different to the first camera or the first camera after the first camera has moved relative to the subject. The scanner variables may thus contain the distance between the first camera and the second camera or the distance moved by the first camera.

The 3D coordinate system is fixed with respect to the medical scanner, so that a position in the 3D coordinate system represents a position with respect to the (non-movable) parts of the medical scanner. Thus, the position of the object keypoints is determined relative to the medical scanner, so the part of the subject being imaged by the scanner is known.

The processor may be configured to determine at least two object keypoint projections. An object keypoint projection may be a projection of the object keypoint onto the corresponding 2D image.

Each camera in the camera system may have a corresponding field of view.

The scanner variables may include the position of a part of the medical scanner which determines a relative position between the cameras in the camera system and the object.

The processor may be configured to determine object keypoint projections of any one of the images based on inputting the images into a neural network, wherein the neural network is configured to output the object keypoint projections in each one of the input images.

Neural networks can be trained to identify object keypoint projections in the 2D images and output 2D coordinates for each one. Additionally, neural networks can be trained to detect and/or identify the object keypoint projections even when they are obstructed in the image. For example, a shoulder of a subject may be obstructed by the medical scanner and thus an image of the subject would not show the shoulder. However, the neural network can learn the patterns between the relationships of the object keypoint projections and estimate the position of the obstructed shoulder based on the position of, for example, the other shoulder and the head, as well as using the patterns the network has learnt between both shoulders and the head (i.e. typical distances between them).

The neural network may be trained to learn the relationships between object keypoint projections corresponding to different parts of the object. In other words, the neural network may be trained to learn the spatial relationship between particular object keypoint projections. For example, the object may be a subject and the neural network may be trained with images of the subject in the medical scanner and a plurality of object keypoint projections corresponding to different body parts of the subject.

The neural network may be based on a U-Net neural network architecture.

U-Net networks consist of a contracting path and an expansive path. The contracting path is similar to typical convolutional networks which reduce the dimensionality whilst increasing feature information with each layer of the contracting path. The expansive path then combines the increased feature information with spatial information through a series of up-convolutions and concatenations, thus each layer of the expansive path increases the dimensionality of the data.

U-Net neural networks were developed for the purpose of biomedical image segmentation and require a lower amount of training data whilst yielding outputs with high precision.

The camera system comprises exactly one camera. The movement of the scanner part enables a single camera to be used to obtain the object keypoints.

The medical scanner may be a magnetic resonance imaging, MRI, scanner comprising a table for positioning a subject and an imaging section for obtaining medical images, and wherein the scanner variables include the position of the table relative to the imaging section.

Determining the object keypoints may be further based on triangulating the object keypoint projection in an image taken before a first movement and the object keypoint projection in an image taken after the first movement based on the distance moved during the first movement.

For example, the first movement may be a table on an MRI scanner moving 10 cm horizontally. An image can be taken before this movement and an image can be taken after the movement, and the respective object keypoint projections can be determined for both the images. The apparent displacement between two corresponding keypoints (e.g. head) between both images can be calculated and thus the real distance, 10 cm, can be used to triangulate the object keypoint projections and thus find the 3D coordinates of the corresponding object keypoint.

The processor may be further configured to determine imaging parameters for the medical scanner based on the object keypoints. The object keypoints may in this way also be used to automatically determine imaging parameters for the medical scanner. The imaging parameters could include the imaging plane, the positioning of the scanner etc. The imaging parameters would depend on the desired object part to be imaged.

For example, if the operator of the medical scanner wants to image the L4 vertebrae, the processor can use typical distances between the hip and shoulders and the L4 vertebrae to determine the positioning (i.e. x,y,z positioning) and the angle of the imaging part in order to image the L4 vertebrae.

The invention also provides a method for obtaining object keypoints for an object in a medical scanner, wherein the object keypoints are three dimensional, 3D, coordinates with respect to the medical scanner, the method comprising:

- obtaining two dimensional, 2D, images of the object in the medical scanner from a camera system, wherein the camera system comprises one or more cameras;
- obtaining scanner variables from the medical scanner and/or the camera system, wherein the medical scanner contains a first moving part and/or wherein the camera system contains a second moving part and wherein the scanner variables include the position of the first moving part of the medical scanner and/or the second moving part of the camera system;
- determining object keypoint projections in 2D coordinates based on the 2D images; and
- determining the object keypoints in 3D coordinates by triangulating the object keypoint projections with respect to the camera system based on the scanner variables.

Determining the object keypoint projections of any one of the images may be based on inputting the images into a neural network, wherein the neural network is configured to output the object keypoint projections in each one of the input images.

The neural network may be based on a U-Net neural network architecture.

The camera system may comprise one camera.

The medical scanner may be a magnetic resonance imaging, MRI, scanner comprising a table for positioning a object and an imaging section for obtaining medical images, and wherein the scanner variables contain the position of the table relative to the imaging section.

Determining the object keypoints may be further based on triangulating the object keypoint projection in an image taken before a first movement and the object keypoint projection in an image taken after the first movement based on the distance moved during the first movement.

The method may further comprise determining imaging parameters for the medical scanner based on the object keypoints.

The invention also provides a computer program product comprising computer program code means which, when executed on a computing device having a processing system, cause the processing system to perform all of the steps of the above mentioned methods.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
FIG. 1 shows a subject on the table of a medical scanner.
Figure 1:
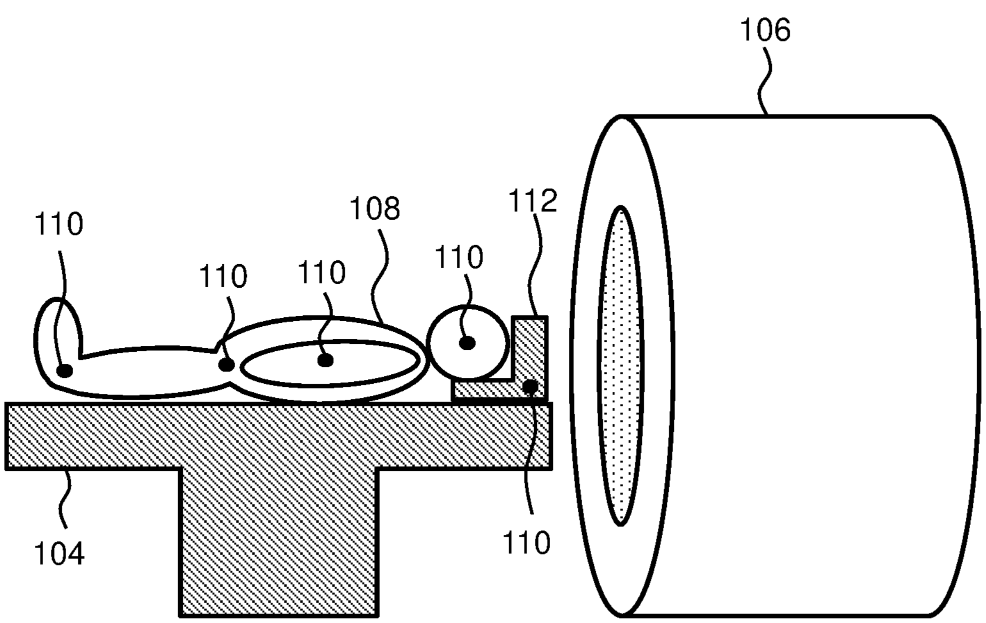

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a system for obtaining object keypoints for an object in a medical scanner, wherein the object keypoints are three dimensional, 3D, coordinates with respect to the medical scanner of pre-determined object parts. The system comprises a camera system for obtaining two dimensional, 2D, images of the object in the medical scanner, wherein the camera system comprises one or more cameras, and a processor. The processor is configured to obtain scanner variables from the medical scanner, wherein the scanner variables include the position of a part of the medical scanner which determines a relative position between the cameras in the camera system and the object. The processor determines object keypoint projections in 2D coordinates based on the 2D images from the camera system and determines the object keypoints in 3D coordinates by triangulating the object keypoint projections with respect to the camera system based on the scanner variables.

FIG. 1 shows a subject 108 on the table 104 of a medical scanner. The camera system 102 is above the subject 108 (and the medical scanner) and takes images of the subject 108, the medical scanner and any objects. For example, the camera system 102 can take images which include the subject 108, the imaging section 106 of the medical scanner and the headrest 112. The images from the camera system 102 can then be used to obtain 3D coordinates for object keypoints 110.

Figure 2:
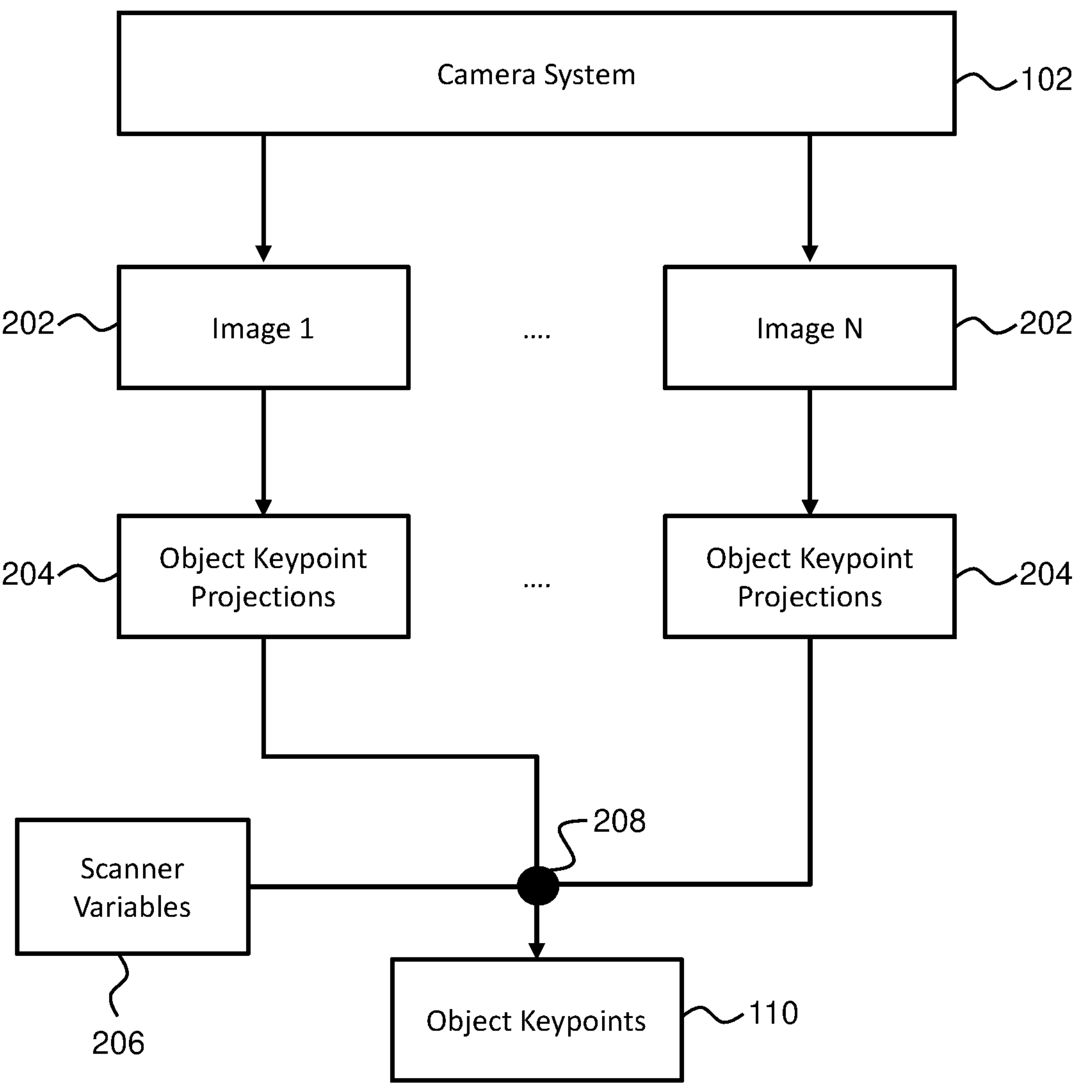
FIG. 2 shows a flow diagram showing how to obtain the object keypoints.

FIG. 2 shows a flow diagram showing how to obtain the object keypoints 110. From the images 202 obtained by the camera system 102, object keypoint projections 204 are determined. Object keypoint projections 204 are 2D coordinates projected on to the images 202 based on the object keypoints 110. These may include certain body parts of the subject 108 (head, shoulders, elbows, hips etc.) and objects like the headrest 112, coils in the scanner etc. Any number of images 202 may be determined based on the number of cameras in the camera system 102 and the time between images 202.

The scanner variables 206 are also obtained from the medical scanner. The scanner variables 206 give the position of the table 104 or imaging section 106 relative to the camera system 102. This could include the vertical position of the table 104, the horizontal position of the table 104, the angle of the table 104 (if applicable) or any other variables which indicate the relative position. An initial distance may be known initially (e.g. when the table 104 is in an initial position before a medical examination). The distance between the camera system 102 and the table 104 (or imaging section 106) can then always be determined by the initial distance and the scanner variables 206.

In a first example, two (or more) cameras in the camera system 102 are used at different positions to take two (or more) images 202 of the subject 108. The images 202 will be from different points of views as the cameras cannot be positioned in the exact same position. Thus, the object keypoint projections 204 in each one of the images 202 will not be in the same position. The table 104 may have been moved between the images 202 (i.e. if images 202 were not taken at the same time). However, the motion of the table 104 can be quantified by the scanner variables 206. Thus, the position of the subject 108 in each one of the images 202 can be "normalized" (i.e. translated to an original position) based on the scanner variables 206. Once each of the images 202 is normalized, the object keypoint projections 204 can be triangulated at point 208 in FIG. 2, thus obtaining object keypoints 110 in 3D coordinates. However, it is not necessary to normalize the images 202 as the motion of the table 104 can be taken into account during the triangulation.

In a second example, only one camera is used in the camera system 102. The camera takes images 202 of the subject 108 at different points in time. When the table 104 moves, the images 202 (at different times) show the table 104, and thus the subject 108, at different positions. From the known distance between the camera system 102 and the table 104 (based on the scanner variables 206), the object keypoint projections 204 of different images 202 can be triangulated to obtain the object keypoints 110 in 3D.

With the scanner variables, the distance and the relative position between the camera system 102 and any part of the medical scanner can always be found. This also means that the relative position of the between the subject (and other objects) and the camera system 102 is also known. This is due to the nature of medical scanners wherein the subject is placed on, for example, the table 104 of the medical scanner and certain known objects are placed on/around the subject (e.g. headrest 112, blankets etc.).

Scanner variables may include the horizontal motion of the table 104. For example, the table 104 may report a shift of dx horizontally. The object keypoint projections 204 on the images 202 can be determined for images 202 corresponding to the start and end of the motion. The apparent displacement between the object keypoint projections 204 in the images 202 are used to triangulate the distance of the keypoints with respect to the camera(s).

Additionally, the scanner variables may include the vertical motion of the table 104. For example, the camera could be "off-center" such that no object keypoint 110 are located on the camera's center view direction. This is possible since the field of view of the camera can be chosen such that it is large enough. The camera may be positioned such that the table 104 is off-center. Additionally, modern cameras have a large amount of pixels so it is trivial to make any object keypoint 110 off-center. When the table 104 moves vertically, all object keypoints 110 will show apparent lateral motion during vertical motion and can be triangulated in 3D using the apparent lateral shift between two or more images 202 for the known vertical motion range. An oblique centered view can be used equivalently.

Relative motion can be due to movement of parts of the medical scanner moving (and the camera system 102 staying immobile). However, relative movement can also be caused by the camera system 102 being moved with respect to the medical scanner (or parts of the medical scanner). For example, the camera system 102 may be placed on a stationary part of the medical scanner and another part of the medical scanner may move (e.g. the table 104). The medical scanner could be, for example, an MRI scanner, a CT scanner, an X-ray scanner, an ultrasound scanner etc.

A neural network filter may be used to determine the object keypoint projections 204 from the images 202. Object keypoint projection 204 detection based on neural networks has been shown to work even in obstructed sceneries returning the correct visual ray to the object keypoint projection 204 which may be hidden behind an obstruction. This can be done from multiple angles thus resulting in a triangulation of only the keypoints which then allows a dedicated 3D reconstruction of any interrogated object keypoint projections 204, even behind an obstruction.

Object keypoints 110 can be arbitrarily defined on the object's surface or inside the object (e.g. inside the subject's body at a joint location). Neural networks for joint keypoint detection can be trained to detect the joint center from arbitrary view angles. Thus, the triangulated 3D object keypoint 110 corresponds to the joint center also in 3D. This observation provides a fundamental difference to 3D optical sensing based on stereo imaging or time-of-flight imaging which can only detect topmost surface points of optically reflective surfaces. Neural networks for object keypoint 110 detection can be designed for human bodies, arbitrary keypoints thereof (adapted to the clinical application) but also to objects like coils (especially their 3D sensitivity reference points), the headrest 112, the scanner table 104 etc.

A neural network designed to detect the center of the joints from arbitrary view angles can do so even when the images 202 have blocked views. A 3D skeleton could be correctly reconstructed for a subject without distortion because all object keypoints 110 corresponding to a subject from all views are undistorted. This would not be possible with a depth sensing camera as the 3D skeleton would be only a surface skeleton and distorted at parts of the body which were not imaged (i.e. obstructed). Depth camera readings at object borders are also typically prone to larger errors or partial volume artifacts.

Neural network based detection of object keypoints 110 in 3D has significant advantages compared to the RGB depth approach which can only deliver surface coordinates of the topmost exposed surface. This surface may not provide any reliable relation to the actual desired target keypoint. For example, the object keypoint 110 may be covered by an object (cushion, blanket, coil, other body parts (hand over hips), or arbitrary combinations of all of them). In such a case, the true 3D object keypoint 110 position required cannot be recovered easily. Neural networks provides a solution to this problem because they can handle obstructions very well due to the typical complexity and depth of the neural network models.

Additionally, for objects of known size detected by a neural network, the projected size can also be used to estimate the distance between the camera system 102 and the objects. This may be possible, for example, for objects such as coils, mattress elements, support devices, subject fixation devices and table 104 parts. This would not be possible for object keypoints 110 for the subject but could give additional supporting information.

A possible neural network architecture used is the U-Net architecture. The U-Net architecture stems from the fully convolutional network. U-Net networks supplement a typical contracting network by successive layers, where pooling operations are replaced by upsampling operators. The upsampling layers increase the resolution of the output. A successive convolutional layer could then learn to assemble a precise output based on this information. However, other neural network architectures could also be used, including custom architectures for the detection of particular object keypoints 110.

The neural network could be trained with images of subjects in a medical scanner and the corresponding scanner variables. The images used for training have a dedicated balance for medical imaging. For example, the images would be a balance of prone, supine and decubitus poses and arm positions. Additionally, the images may be of subjects with a balance of age, bmi, gender, ethnic distribution etc. Additionally the neural network can be trained with images which include various objects (headrest 112*s*, coils, blankets etc.).

Once the 3D object keypoints 110 are obtained, an imaging plane can be constructed from said object keypoints 110 and a required imaging area for the subject. Alternatively, the 3D object keypoints 110 could be used by an operator (or a separate algorithm) to construct said imaging plane.

Thus, the detected 3D positions of the object keypoints 110 can be used for the preparation of a medical exam using a medical scanner. The coordinate system of the camera system 102 can be registered to the medical scanner coordinate system (patient coordinate system) using a calibration procedure during system installation. The detected 3D object keypoints 110 are used to estimate the position of target examination anatomies. For example, shoulder and hip keypoints define the torso and, from this, the lumbar spine position can be predicted. The target anatomy coordinates (e.g. lumbar spine vertices L4,L5) can be used to automatically set a laser mark and the survey position. From the size of the body region (e.g. torso) other relevant scan parameters like scan volume/range, resolution, fold-over or fat suppression and motion correction techniques can be tailored to the individual subject. All these pre-adjustments lead to improved planning and execution of the scan and lead to more consistent image quality.

Additionally, the relative position of all detected object keypoints 110 allows for the determination of the overall subject position and orientation (e.g. head-first supine or feet-first decubitus-left etc.). This reduces the possibility of manually entering the wrong overall subject position and orientation (current practice) and reduces the likeliness of wrong readings during the examination.

Object keypoints 110 and poses can also be used to calculate safety relevant features. For example, the position of certain keypoints (e.g. hands) are calculated to make sure they don't touch or are forming body loops which represent a safety issue. Similarly the distance of all detected object keypoints 110 to the coil or cables of the medical scanner is calculated to detect potentially wrong setups which may lead to an undesired increase in the risk of RF burns. This could shorten the time-slots for examination and preparation and decrease the likeliness of a mistake being made by the operator.

As discussed above, the system makes use of processor to perform the data processing. The processor can be implemented in numerous ways, with software and/or hardware, to perform the various functions required. The processor typically employs one or more microprocessors that may be programmed using software (e.g., microcode) to perform the required functions. The processor may be implemented as a combination of dedicated hardware to perform some functions and one or more programmed microprocessors and associated circuitry to perform other functions.

Examples of circuitry that may be employed in various embodiments of the present disclosure include, but are not limited to, conventional microprocessors, application specific integrated circuits (ASICs), and field-programmable gate arrays (FPGAs).

In various implementations, the processor may be associated with one or more storage media such as volatile and non-volatile computer memory such as RAM, PROM, EPROM, and EEPROM. The storage media may be encoded with one or more programs that, when executed on one or more processors and/or controllers, perform the required functions. Various storage media may be fixed within a processor or controller or may be transportable, such that the one or more programs stored thereon can be loaded into a processor.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

A single processor or other unit may fulfill the functions of several items recited in the claims. A computer program may be stored/distributed on a suitable medium, such as an optical storage medium or a solid-state medium supplied together with or as part of other hardware, but may also be distributed in other forms, such as via the Internet or other wired or wireless telecommunication systems.

The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to".

Any reference signs in the claims should not be construed as limiting the scope.

The invention claimed is:

1. A system for obtaining object keypoints for an object in a medical scanner, wherein the object keypoints are three dimensional (3D) coordinates with respect to the medical scanner of pre-determined object parts, and wherein the object keypoints are defined inside the object parts, the system comprising:

- a camera system for obtaining two dimensional (2D) images of the object in the medical scanner, wherein the camera system comprises:
- one or more cameras;
- a processor configured to:
  - obtain scanner variables from at least one of the medical scanner or the camera system, wherein the medical scanner contains a first moving part and/or wherein the camera system contains a second moving part, and wherein the scanner variables include a position of the first moving part of the medical scanner and/or a position of the second moving part of the camera system;
  - determine object keypoint projections based on inputting the 2D images into a neural network trained to learn spatial relationships between object keypoint projections corresponding to different parts of the object, wherein the neural network is configured to output the object keypoint projections in each one of the input 2D images, wherein the object keypoint projections are 2D coordinates projected on to the 2D images, respectively;
  - determine the object keypoints in 3D coordinates by triangulating the object keypoint projections with respect to the camera system based on the scanner variables; and determine imaging parameters for the medical scanner based on the object keypoints for imaging a subject.

2. The system of claim 1, wherein the neural network is based on a U-Net neural network architecture.

3. The system of claim 1, wherein the camera system comprises exactly one camera.

4. The system of claim 1, wherein the medical scanner is a magnetic resonance imaging (MRI) scanner comprising:

a table for positioning the subject; and an imaging section for obtaining medical images, and wherein the scanner variables include a position of the table relative to the imaging section.

5. The system of claim 1, wherein determining the object keypoints is further based on triangulating the object keypoint projections in a first image taken before a movement and the object keypoint projections in a second image taken after the movement based on distance covered during the movement.

6. A method for obtaining object keypoints for an object in a medical scanner, wherein the object keypoints are three dimensional (3D) coordinates with respect to the medical scanner and wherein the object keypoints are defined inside object parts of the object, the method comprising:

obtaining two dimensional (2D) images of the object in the medical scanner from a camera system, wherein the camera system comprises one or more cameras;

obtaining scanner variables from at least one of the medical scanner or the camera system, wherein the medical scanner contains a first moving part and/or wherein the camera system contains a second moving part, and wherein the scanner variables include a position of the first moving part of the medical scanner and/or a position of the second moving part of the camera system;

determining object keypoint projections based on inputting the 2D images into a neural network trained to learn spatial relationships between object keypoint projections corresponding to different parts of the object, wherein the neural network is configured to output the object keypoint projections in each one of the input 2D images, wherein the object keypoint projections are 2D coordinates projected on to the 2D images, respectively;

determining the object keypoints in 3D coordinates by triangulating the object keypoint projections with respect to the camera system based on the scanner variables; and determining imaging parameters for the medical scanner based on the object keypoints for imaging a subject.

7. The method of claim 6, wherein the neural network is based on a U-Net neural network architecture.

8. The method of claim 6, wherein the camera system comprises exactly one camera.

9. The method of claim 6, wherein the medical scanner is a magnetic resonance imaging (MRI) scanner comprising:

a table for positioning the subject; and an imaging section for obtaining medical images, and wherein the scanner variables include a position of the table relative to the imaging section.

10. The method of claim 6, wherein determining the object keypoints is further based on triangulating the object keypoint projections in a first image taken before a movement and the object keypoint projections in a second image taken after the movement based on distance covered during the movement.

11. A non-transitory computer readable medium storing computer program code for obtaining object keypoints for an object in a medical scanner, wherein when executed on a computing device having at least one processor, the computer program code causes the at least one processor to:

obtain two dimensional (2D) images of the object in the medical scanner from a camera system, wherein the camera system comprises one or more cameras;

obtain scanner variables from at least one of the medical scanner or the camera system, wherein the medical scanner contains a first moving part and/or wherein the camera system contains a second moving part, and wherein the scanner variables include a position of the first moving part of the medical scanner and/or a position of the second moving part of the camera system;

determine object keypoint projections based on inputting the 2D images of the object into a neural network trained to learn spatial relationships between object keypoint projections corresponding to different parts of the object, wherein the neural network is configured to output the object keypoint projections in each one of the input 2D images, wherein the object keypoint projections are 2D coordinates projected on to the 2D images, respectively;

determine the object keypoints by triangulating the object keypoint projections with respect to the camera system based on the scanner variables, wherein the object keypoints are three dimensional (3D) coordinates with respect to the medical scanner and wherein the object keypoints are defined in an object part of the object; and determine imaging parameters for the medical scanner based on the object keypoints for imaging a subject.

12. The non-transitory computer readable medium of claim 11, wherein the neural network is based on a U-Net neural network architecture.

13. The non-transitory computer readable medium of claim 11, wherein the camera system comprises exactly one camera.

14. The non-transitory computer readable medium of claim 11, wherein the medical scanner is a magnetic resonance imaging (MRI) scanner comprising:

a table for positioning the subject; and an imaging section for obtaining medical images, and wherein the scanner variables include a position of the table relative to the imaging section.

15. The non-transitory computer readable medium of claim 11, wherein the computer program code causes the at least one processor to determine the object keypoints further based on triangulating the object keypoint projections in a first image taken before a movement and the object keypoint projections in a second image taken after the movement based on distance covered during the movement.

16. The non-transitory computer readable medium of claim 11, wherein the imaging parameters comprise at least one of an imaging plane or a positioning of the medical scanner.

* * * * *